No. 828,823. PATENTED AUG. 14, 1906.
A. P. MAIZE.
SNAP HOOK.
APPLICATION FILED FEB. 17, 1905.
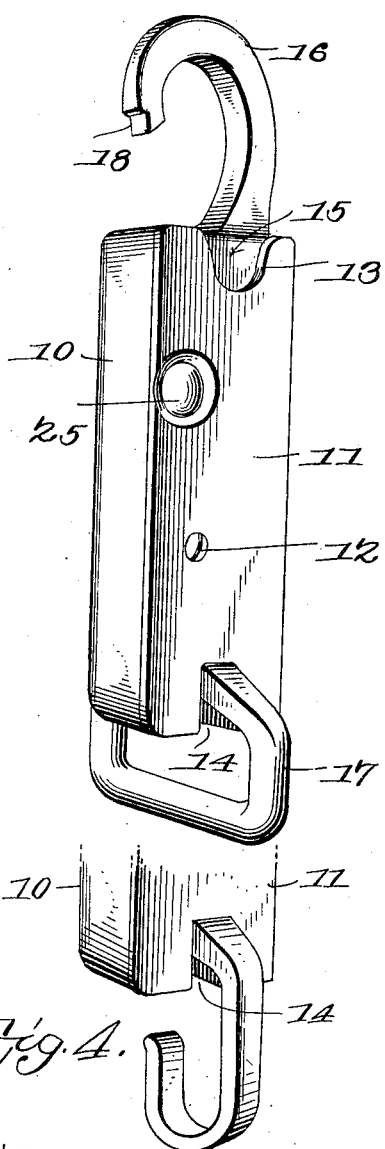
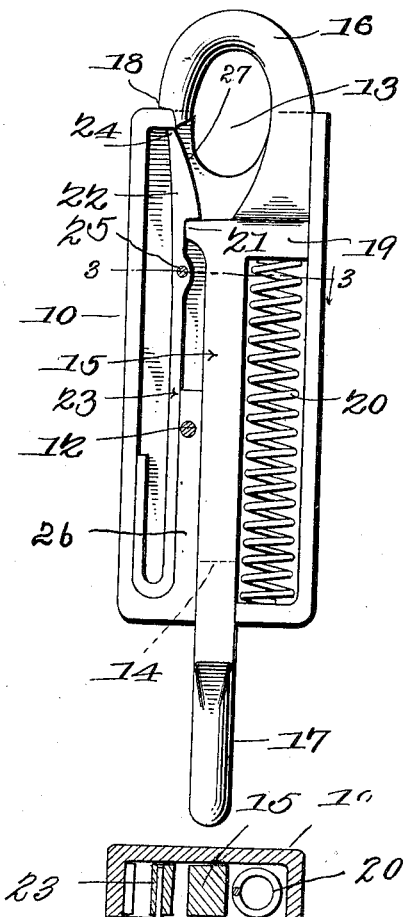
Witnesses
Adam P. Maize, Inventor.
by
Attorneys

UNITED STATES PATENT OFFICE.

ADAM P. MAIZE, OF MILLHEIM, PENNSYLVANIA.

SNAP-HOOK.

No. 828,823.     Specification of Letters Patent.     Patented Aug. 14, 1906.

Application filed February 17, 1905. Serial No. 246,140.

*To all whom it may concern:*

Be it known that I, ADAM P. MAIZE, a citizen of the United States, residing at Millheim, in the county of Center and State of Pennsylvania, have invented a new and useful Snap-Hook, of which the following is a specification.

This invention relates to snap-hooks employed upon harness and for similar purposes, and has for its object to simplify and improve the construction and increase the efficiency of devices of this character.

With this and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved device in open position. Fig. 2 is a side elevation of the same in closed position with the detachable side of the casing removed. Fig. 3 is a transverse section, enlarged, on the line 3 3 of Fig. 2. Fig. 4 is a perspective detail of a portion of the lower part of the device, illustrating a modification in the construction.

The improved device comprises a casing 10, having parallel sides and one side 11 detachable and secured to the body of the casing, as by a screw 12, and with apertures in the ends. The casing 10 and its detachable side 11 are provided at the ends with transverse recesses 13 14 and an internal longitudinal rib 26, spaced from one side of the casing and slidably disposed through the casing longitudinally, and bearing against the rib 26 is a bolt 15, having an open hook 16 at one end and a closed loop 17 at the other end, the loop and hook being at all times exteriorly of the casing. When the bolt is disposed in one of its two positions, the closed loop 17 will enter the recess 14, as in Fig. 1, and when the bolt is disposed in the other of its two positions the interior of the hook 16 will register with the recess 13, as shown in Fig. 2.

The point 18 of the hook 16 is notched to fit the inner corner of the top of the casing 10, as in Fig. 2, to increase the "grip" between the hook and casing when the hook is closed.

The bolt 15 is provided with a shoulder 19 on one side, against which a U-shaped spring 23 bears to maintain the bolt yieldably in open position, as shown in Fig. 1, and the bolt is also provided with a lateral lip 21 upon the opposite side, with which a projection 22 on the resilient member 23 engages when the bolt is closed, the free end 24 of the resilient member bearing movably against the end wall of the casing at one side of the recess 13, as in Fig. 2. The U-shaped spring is thus firmly supported between the intermediate rib 26 and the adjacent wall of the casing and requires no other holding means. The strain on the bolt is thus borne by the offset or projection 22, which is relatively large and strong, so that it will not be crushed by any pressure to which it may be subjected. The inner face 27 of the portion 22 of the U-shaped spring is inclined so as to form a barbed terminal against which the lip 21 of the bolt 15 operates when closing to cause the spring member to yield and permit the lip to pass to its seat beneath the barbed portion. The closing action of the bolt is thus automatic. The resilient member 23 is also provided with a stud or button 25, projecting through an aperture in the detachable side 11, so that the resilient member may be moved laterally to detach the portion 22 and release the bolt, which will then be automatically opened by the spring or moved into the position shown in Fig. 1.

When the device is to be used, the button 25 is actuated to release the bolt and the hook 16 engaged with the ring or other part of the harness or other structure and the hook forcibly compressed into the casing 10 or the casing forcibly moved toward the hook until the lip 21 is automatically engaged by the enlargement 22 of the resilient member and the notch 18 likewise engaged by the adjacent portion of the casing. The closing of the hook is thus very quickly accomplished and requires no manipulation of parts except the compression of the casing upon the bolt, or vice versa, and the bolt can be very readily released by merely moving the button 25 laterally for a short distance.

The device is simple in construction, strong and durable and very efficient in action, and can be readily adapted to all the uses for which any other form of snap-hook is employed.

Minor changes may be made in the device—as, for instance, substituting another form of spring than that shown at 20 or providing a hook for the loop 17—without departing from the principles of the invention, as will be obvious.

Having thus described the invention, what is claimed is—

1. A casing having apertures formed in the opposite ends thereof and provided with a longitudinally-disposed rib spaced from one side of the casing, a bolt slidably mounted in the casing and having its opposite ends extended through said apertures and provided with draft-engaging means, said bolt having a shoulder on one side thereof and a stop-lip extending laterally from the opposite side of the bolt, a spring-arm interposed between one side of the rib and the adjacent wall of the casing and provided with a barbed terminal for engagement with the lip, and a spring disposed on the opposite side of said rib and bearing against the shoulder on the bolt.

2. A casing provided with parallel side walls and having apertures formed in the opposite ends thereof, a longitudinally-disposed rib arranged within the casing and spaced from one of the side walls thereof, a bolt slidably mounted in the casing and having its opposite ends extended through said apertures and provided with draft-engaging means, said bolt having a shoulder on one side thereof and a stop-lip extending laterally from the opposite side of the bolt, a U-shaped spring-arm bearing against one side of the rib and the adjacent side wall of the casing and having one of its side members extended and provided with a barbed terminal for engagement with the stop-lip, and a spring interposed between the shoulder and one end of the casing.

3. A casing having apertures formed in the opposite ends thereof, a bolt slidably mounted in the casing and having its opposite ends extended through said apertures and provided with draft-engaging means, said bolt having a shoulder on one side thereof and a stop-lip extending laterally from the opposite side of the bolt, a spring-arm supported within the casing and having one end thereof provided with a barbed terminal for engagement with the stop-lip, means operative from the exterior of the casing for actuating the spring-arm, and a spring disposed within the casing and bearing against the shoulder.

In testimony that I claim the foregoing as my own I have hereto affixed my signature in the presence of two witnesses.

ADAM P. MAIZE.

Witnesses:
 WM. S. SHELTON.
 WM. S. MAIZE.